United States Patent [19]
Goell et al.

[11] 4,081,258
[45] Mar. 28, 1978

[54] METHOD FOR USING ON LINE OPTIC FIBER LOSS MONITOR

[75] Inventors: James E. Goell; Gary W. Bickel; Charles K. Kao; Mokhtar S. Maklad, all of Roanoke, Va.

[73] Assignee: International Telephone and Telegraph Corporation, Nutley, N.J.

[21] Appl. No.: 685,861

[22] Filed: May 12, 1976

[51] Int. Cl.² ............................................. C03B 37/02
[52] U.S. Cl. ....................................... 65/2; 65/11 W; 65/13; 65/29; 65/158; 356/201
[58] Field of Search .................. 356/201; 65/2, 11 W, 65/29, 158, 13

[56] References Cited

U.S. PATENT DOCUMENTS

| | | | |
|---|---|---|---|
| 3,690,774 | 9/1972 | Kottle et al. | 356/201 X |
| 3,879,128 | 4/1975 | Presby | 65/13 X |

OTHER PUBLICATIONS

Bell Laboratories Record, Nov., 1972, pp. 303-311, "Measuring Loss in Optical Fibers," Arthur Tynes.
Applied Optics, March, 1974, vol. 13, #3, pp. 467-469, "Power Handling . . . Lightguides," John Crow.

*Primary Examiner*—Robert L. Lindsay, Jr.
*Attorney, Agent, or Firm*—John T. O'Halloran; Thomas M. Marshall

[57] ABSTRACT

A method and means is disclosed for continuously monitoring an optical fiber's attenuation or loss as it is being formed, which includes: a light source, which may be the heated fiber itself during drawing operations or an external source; passing the light through the fiber being produced; positioning the end of the fiber in a holder adjacent to a light detector, for example a photodiode with or without passing the transmitted light through a filter; detecting the light transmitted by the fiber from the light source; converting the detected light into an electrical equivalent signal; amplifying the signal if necessary and recording or observing the changes in the signal to determine an objective measure of the optical fiber's attenuating characteristic.

13 Claims, 9 Drawing Figures

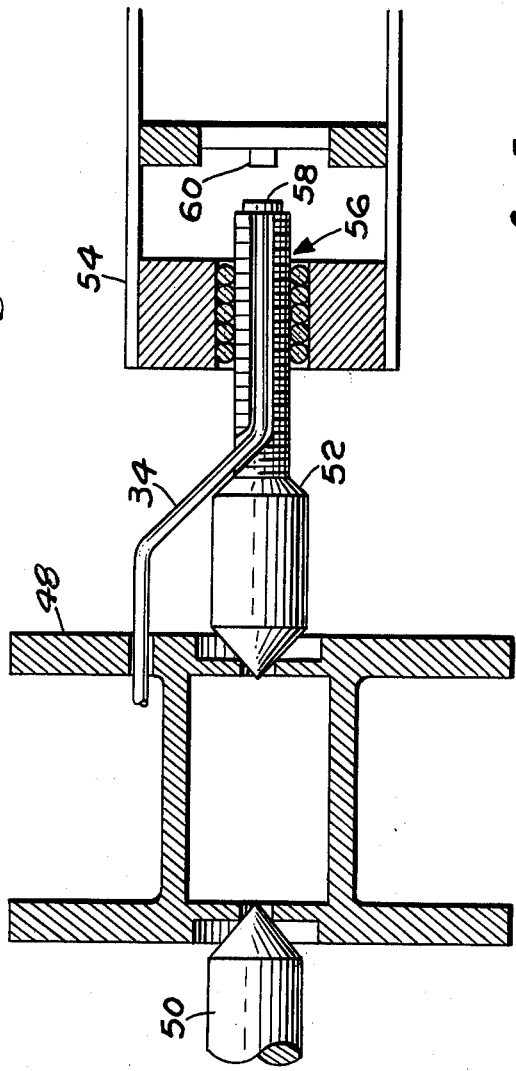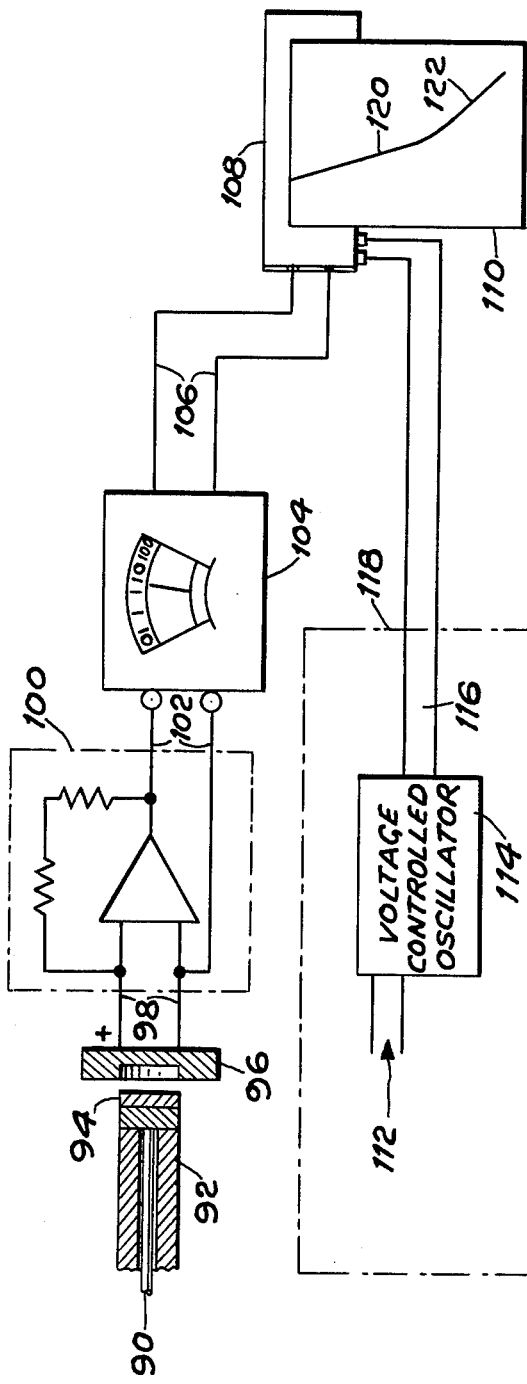

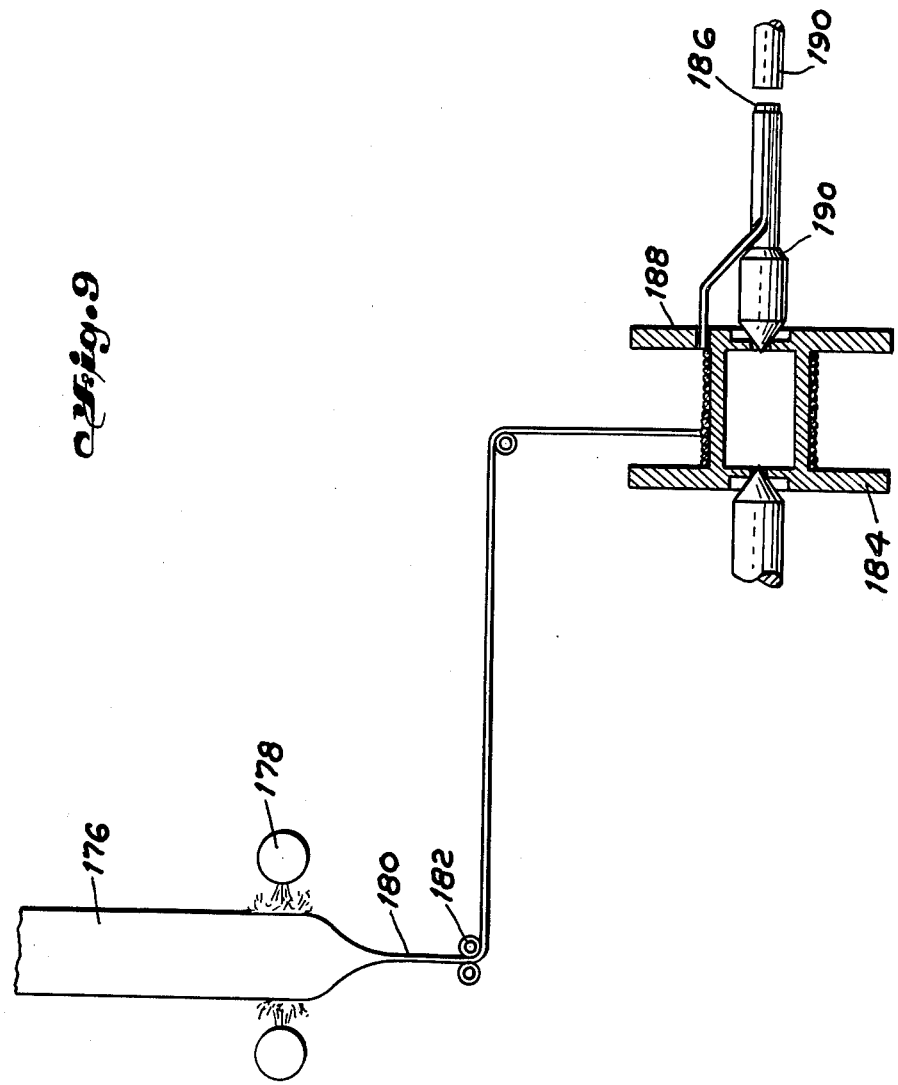

METHOD FOR USING ON LINE OPTIC FIBER LOSS MONITOR

BACKGROUND OF THE INVENTION

1. Field of the Invention

Optical fiber products and quality control.

2. Prior Art

There is no known prior art method or device for continuously determining the loss characteristic or attenuation of optical fibers as they are produced. With the increased use of optical fibers in communication systems and other end uses it has become more and more important to be able to know the loss characteristics of optical fibers. It may also be desired to utilize the information so obtained to control the fiber drawing process. Furthermore by noting the loss characteristics of a specific fiber it is possible to avoid the use of that fiber in any circumstance where the attenuation characteristics would be critical in the operation of the device in which the optical fiber is utilized. Thus monitoring the loss characteristics has become an important quality control technique in optical fiber manufacture.

SUMMARY OF THE INVENTION

In the course of drawing optical fiber from a preform a substantial amount of heat is utilized to lower the viscosity of the preform or soften it by heating it to a temperature high enough so that it can be effectively drawn. Since that heat may be as high as 2,000° C or upwards, the heated portion of the fiber preform constitutes a "grey" body light source. Some of that light from the grey body source is captured by the fiber in the sense that light is trapped in the optical waveguide or fiber and is accordingly transmitted through the previously drawn section of the fiber. Since the "grey" body light transmitted through the fiber is subject to the same attenuation factors as light from any other source when propagated through the fiber, by placing the starting end of the fiber in a suitable position with respect to an optical detector, a record of the "grey" body light output at the fiber end as a function of the length of the fiber, directly as a function of time, may be observed or recorded. This observation or record is a measurement of the fiber's loss or attenuation in the spectral region defined by the "grey" body spectral light distribution, the spectral sensitivity of the detector, the spectral transmission factor of any filter used with the detector and, to a limited extent, the spectral transmission of the fiber.

In one form of a device suitable for use in connection with this invention the starting end of a fiber being drawn is positioned adjacent a large area silicon photodiode and controller which had a cover fixture through which the prepared starting end of the fiber is inserted. Measurements made indicate that over finite lengths sufficient light is transmitted by the fiber as it is drawn to give useful data so as to determine the light loss or attenuation of the specific fiber being tested. In this specific example the fiber being drawn was allowed to accumulate without being associated with any take-up.

When a fiber take-up mechanism is utilized it will affect the actual form of the measurement equipment. For a non-rotating storage medium, for example, canister storage, floor accumulation, loose coil, etc., a relatively simple set up may be used involving a fiber holder and a clamp to position the starting end of an optical fiber within the housing of a detector with a filter being positioned between the detector and the end of the optical fiber. The signal from the detector is amplified and applied to a meter and a recording strip chart mechanism.

Where the fiber storage medium is a rotating mechanism such as a drum or a spool, the shaft or spindle of the drum or spool is provided with an entrance slot through which is passed the starting end of the optical fiber so that it is positioned within the rotating shaft or spindle and has its prepared end adjacent a filter or glass plate which in turn is adjacent the active area of a detector which is in a fixed position. The signal thus obtained is amplified, observed or recorded as desired.

Additionally, it is suggested that the light source described above, i.e. the thermal radiation from the drawdown cone could be replaced by a laser or filtered light source directed into a suitably prepared end of the fiber preform. This permits the utilization of a more sophisticated, detection technique including synchronous or lock-in detection techniques.

The method and apparatus thus obtained may be utilized as a quality control measure or may be used to control the drawing rate or temperature to achieve uniformity of the loss or attenuation characteristics of an optical fiber being produced.

BRIEF DESCRIPTION OF THE DRAWINGS

FIG. 3 is a further diagrammatic view illustrating a portion of an apparatus suitable for practicing the method of this invention;

FIG. 5 is a diagrammatic illustration of a still further alternate form of apparatus suitable for practicing the method of this invention;

FIG. 9 is a diagrammatic illustration of an optical fiber preform being subjected to heating for purposes of drawing it into a fiber which is collected on a spool such as is illustrated in FIG. 3 including the portions of the detector housing to illustrate the method of this invention.

DESCRIPTION OF THE PREFERRED EMBODIMENTS

Figure 1:
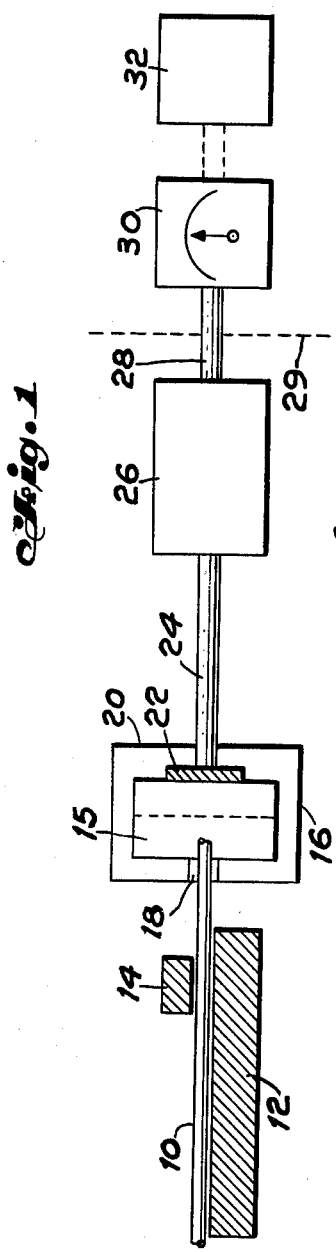
FIG. 1 is a diagrammatic illustration of one form of an apparatus suitable for carrying out the method of this invention.

Referring to FIG. 1, a simplified form of an apparatus capable of carrying out the method of this invention is illustrated. A drawn optical fiber 10 is positioned on a fiber support 12 and held in place thereon by clamp 14 so that its prepared end 15 is located within a photodetector housing 16. The opening 18 through which the end 15 of fiber 10 is positioned is designed so that virtually the only light which is detected by the detector 22 is that which is transmitted through optical fiber 10.

As pointed out above, due to the 2,000° or higher temperature involved in reducing the viscosity of the optical fiber preform (not shown) there is a substantial quantity of thermal radiation appearing as "grey" body light transmitted through optical fiber 10 during the course of its being drawn. That grey body light, after passing through a filter 20 (optional) is received by detector 22 and converted by known techniques to an electrical signal. The electrical signal appears on line 24 which passes to an amplifier 26. In many instances a milli-volt meter will provide sufficient amplification to act as an amplifier of the signal. In the form illustrated in FIG. 1, amplifier 26, provided with the signal from detector 22, in turn passes it to a meter 30 and alternately to a strip chart recorder 32 or any other similar recording or utilization device.

The apparatus of FIG. 1 would be utilized in connection with production of an optical fiber where the optical fiber 10 is not being taken up on a spool or drum which is rotating. Thus where the optical fiber is allowed to accumulate on the floor, in a canister or in loose coils it is feasible to hold optical fiber 10 in a fixed position during the course of drawing the optical fiber 10. In the portion of the apparatus illustrated in FIG. 2, it is assumed that the optical fiber 34 is being accumulated on a spool or drum which has a shaft 36 which rotates as the spool or drum (not shown) accumulates the drawn optical fiber. The starting end of the optical fiber 34 is passed through an entrance slot 38 in the rotating shaft or spindle 36 into an opening in the center of the spindle 36. The shaft 36 in turn is journalled in bearing 40. At the end of the hollow spindle fiber support area 39 of shaft 36, a filter or glass plate 42 may be positioned. A non-rotating detector 44 is positioned so that its active area 45 is adjacent the filter or glass plate 42 so that it will receive light transmitted through fiber 34 and develop an electrical signal which is fed to amplifier or recording member (i.e. a milli-volt meter) monitor as described in connection with the device illustrated in FIG. 1.

Figure 2:
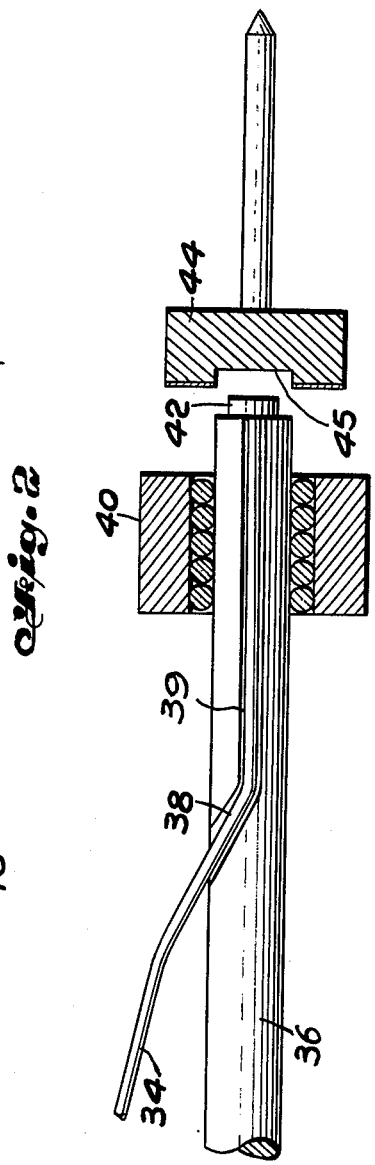
FIG. 2 is a diagrammatic view of a portion of an alternate form of apparatus suitable for practicing the method of this invention.
Figure 6:
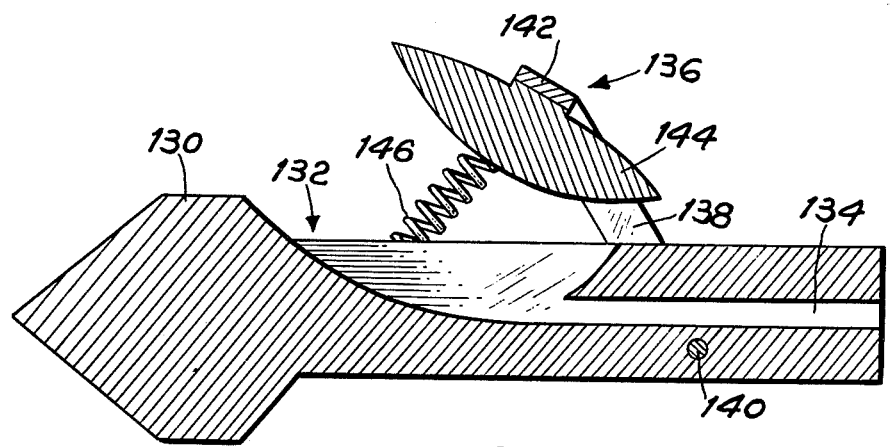
FIG. 6 is a cross sectional elevational view of a portion of a rotating spindle useful in the type of device illustrated in FIGS. 2 and 3.
Figure 7:
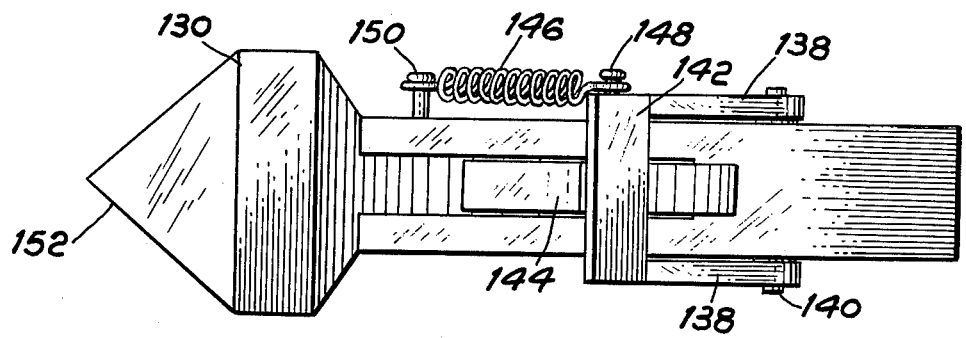
FIG. 7 is a top view of the device illustrated in FIG. 6.

One possible construction of a device useful in the form of the apparatus illustrated in FIGS. 2 and 3 is illustrated in FIGS. 6 and 7. A rotating shaft indicated generally at 130 includes an entrance slot indicated at 132 into which the prepared starting end of optical fiber 45 is positioned so as to be situated in the open hollow portion 134. A clamp 136 comprising a pair of arms 138 pivotably mounted on a through shaft 140 carries a cross piece 142 and an arcuate clamp member 144 which has a cross section similar to the bottom portion of the area 132 which is the optical fiber entrance slot. A tensioning spring 146 positioned between a stud 148 and a pin 150 supplies pressure to maintain the optical fiber in a clamped position during the operation of the device. The end 152 of shaft 130 is adapted to be driven by the drum or spindle on which the optical fiber is being collected as it rotates.

FIG. 3 shows in more detail a form of the device of this invention involving a take-up spool 48 on which the fiber 34 is being wound. A portion of the spool drive 50 is illustrated which rotates the spool 48 shown in partial cross section as well as a hollow spindle 52 having an entrance slot and center opening as described above. The center opening in the slotted spindle 52 is closed by a filter 58. Bearing 56 supports the slotted spindle 52 for rotating thereon and which bearings 56 are in turn carried by a tailstock housing 54. A detector 60 is positioned opposite filter 58 so that it is in line with the prepared end of optical fiber 34 to receive the light transmitted by optical fiber 34. As before, electrical signals produced by detector 60 are amplified and the amplified signal observed or recorded.

Figure 4:
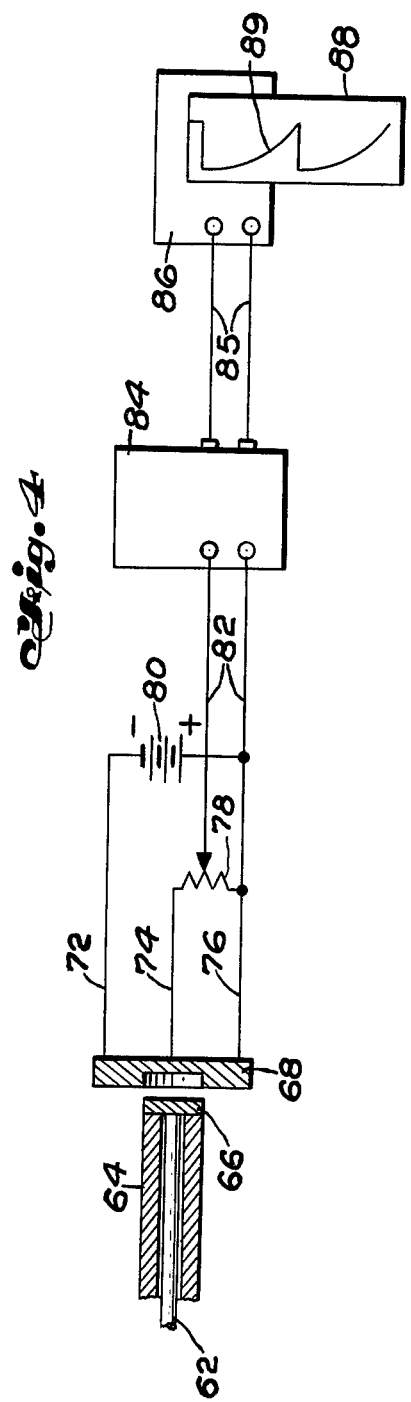
FIG. 4 is a diagrammatic illustration of another alternate form of an apparatus suitable for practicing the method of this invention.

Referring to FIG. 4, another form of an apparatus suitable for carrying out this invention is illustrated in which a fiber 62 is positioned in the center of a rotating spindle 64 which in turn has a filter 66 which closes the central opening in the rotating spindle 64. A photodiode 68 is positioned adjacent filter 66 to receive the light transmitted by fiber 62. Connections to the cathode 72, guard ring 74 and anode 76 carrying the signal developed from power source 80, as adjusted by variable resistor 78, on lines 82 to a milli-volt meter 84 utilized as an amplifier. The thus amplified signal is carried by output lines 85 to a strip chart recorder 86 and illustrated diagrammatically at 88 is a strip chart illustrating a typical trace 89 of the recorded signal.

FIG. 5 illustrates still a further modification of the device for carrying out the method of this invention wherein an optical fiber 90 is positioned in a rotating spindle 92 whose inner end is terminated by a filter 94 positioned adjacent a photovoltaic detector 96. The signal thus produced, which is a direct analog of the light transmitted by optical fiber 90, is applied to the input of an operational amplifier 100 illustrated diagrammatically and the output of operational amplifier 100 is utilized to the input of a log voltmeter 104. In turn the output of log voltmeter 104 is put into strip chart recorder 108 to produce strip 110. In addition, the strip chart recorder 108 may have its speed controlled by utilizing a d.c. signal from the fiber pull speed control 112 which is processed by a voltage controlled oscillator 114 to provide a signal on leads 116 for the input 118 to the external chart speed input control.

Illustrated on chart 110 is a signal trace 120 representing a finite length of the optical fiber loss and at 122 a short length loss trace. While in the various forms of apparatus illustrated in the Figures the outputs are represented by observer meters or in the form of strip chart recorders 88, 89, 110, 120, 122, it will be appreciated that the signal obtained, since it is a direct result of the fiber's attenuation could be utilized to control one of the operating parameters of the fiber drawing process, i.e. drawing speed, temperature and the like. In the form of the charts illustrated, the trace 89, 120, 122 provide a direct indication of the fiber attenuation as a function of time and hence length of the drawn fiber. The slope of the curve thus produced provides a direct measure of the loss or attenuation characteristics of the optical fiber and thus provides an effective quality control device as well as a permanent record of the fiber loss or attenuation characteristic of any given fiber as it is being produced. This would permit the matching of a plurality of fibers in a system insofar as their loss or attenuation characteristics are concerned, as well as the selection of only those fibers or portions of fibers having predetermined characteristics for use in various applications.

It will be appreciated that as described above either the grey body light source provided by the thermal radiation from the drawn-down cone of the fiber preform may be utilized as the light source or that a laser or filtered light source, chopped or directly modified, could be directed into a suitably prepared end of the fiber preform. This would permite use of more sophisticated detection devices than those shown in the previous drawings, including synchronous or lock-in detection.

Figure 8:
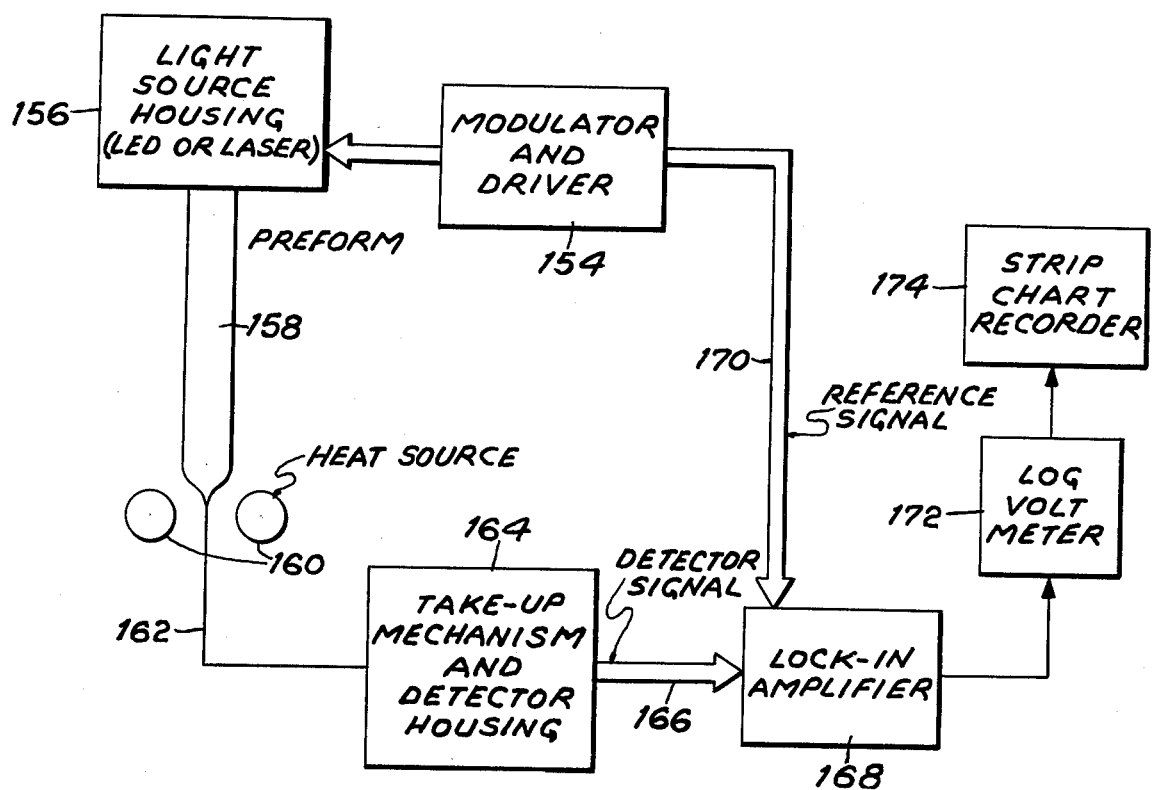
FIG. 8 is a diagrammatic illustration of an alternate form of apparatus suitable for practicing the method of this invention.

One such apparatus is illustrated diagrammatically in FIG. 8. A modulator and driver 154 provides a signal to a light source housing 156, which light source may be a light emitting diode or laser positioned so that its light is emitted into a preform 158, whose end adjacent the light source housing 156 has been suitably prepared. Thus a modulated light signal is transmitted through the fiber preform 158 as the preform 158 is being heated by a heating source, diagrammatically illustrated at 160, and as it is drawn into an optical fiber 162. The optical fiber 162 is passed to a take-up mechanism of the general type illustrated above which, in connection with a detector (both of which are illustrated in the area 164) which produces an output signal on lines 166 which is fed to a lock-in amplifier 168, which is also supplied, on lines 170, with a reference signal from the modulator and driver of 154. The output of lock-in amplifier 168 is fed to a log voltmeter 172 and if desired from thence to an utilization mechanism, such as a strip chart recorder 174. Another form of the device, not illustrated, is wherein the prepared end of a drawn optical fiber is positioned in a rotating holder so that it would rotate past a stationary detector once in each revolution. The resulting output of the detector would be one pulse due to the light transmitted from the fiber which would appear as a spike on any d.c. signal level present in the output of the device due to background light levels. In this instance the attenuation or loss characteristics could be determined by reference to the height of the spike of the pulse compared to the background. In each of the cases described herein the purpose is to derive a signal which can be applied to a utilization mechanism, i.e. a meter, strip chart recorder, feedback controller, etc.

Tests of the device illustrated in FIG. 1 utilizing a silicon photodiode and controller (United Detector Technology) having a cover fixture into which the starting end of the fiber was inserted after it had been properly prepared, were conducted. The fiber in this case was allowed to accumulate on the floor without any form of take-up. In this test a plastic coated silica fiber was utilized. Calculations were made utilizing the data from the test which determined that sufficient light in the spectral transmitted range was available to permit adequate detection. The test was repeated using several different filters and detectors, for example a photo multiplier in place of the silicon photodiode. In one such test, a plastic coated silica fiber produced a plot roughly in the form of that illustrated in FIG. 4 at 89. Calculations show that the plastic coated silica fiber tested had a fairly high loss. In this example, the fiber was being pulled at a rate of 23 meters per minute while the chart speed was run at 1 inch per minute so that the trace on the chart equal 23 meters per inch. The fiber had a total length of 0.306 km. The signal at 0 length, (i.e. the start) was a 0.305 volt and, at the full length of 0.306 km, the signal was 0.010 volts. Calculating the loss as being equal to $10 \log_{10}(P_O/P_L)$ produced a determination that there was a 14.8 db loss in the actual length involved or a total loss of 48.5 db/km.

In another test, utilizing the same pull rate and chart speed, involving drawing a low loss CVD fiber, a trace was produced which, by applying the calculations as described above, showed that the fiber being produced had a loss of 11.8 db/km.

It should also be pointed out that in connection with producing the fiber traces that in the event of bubbles or other imperfections in the optical fiber as it is being drawn, the light transmission will be affected and accordingly flaws in the fiber appear on the observation meter or on the chart's trace as a direct indication of an abrupt change in the fiber's attenuation characteristics. This is a further useful feature of this invention since it would permit indication of bad spots, including bubbles in the preform or in the fiber as produced or similar imperfections affecting the quality of the optical fiber.

In the diagrammatic illustration of FIG. 9 an optical fiber preform 176 is being subjected to a heat source 178 sufficient to reduce viscosity of the preform to a point at which a fiber 180 may be drawn by drawing rolls 182 from which point it is taken up on a collection spool 184. The starting end 186 of the fiber 180 is led through an opening 188 in the spool 184 into a hollow spindle 90 driven by the spool 184 so that the starting end 186 or beginning end of the fiber is positioned adjacent a detector 190. Any one of the techniques illustrated in FIGS. 1, 4, 5 or 8 may be utilized to obtain an objective measure of the fiber's light attenuation characteristics and may be recorded or observed as previously described.

It will be appreciated by those skilled in the art that the utilization of either the "grey" body light source or other form of light source such as a laser or any other light source will depend upon the specific characteristics designed to be measured or manufactured. Furthermore, the usefulness of the information obtained, whether it is merely recorded, observed or utilized as an input error signal, will depend entirely on the desire of the user of the method and apparatus of this invention.

Furthermore, it will be appreciated by those of skill in the art that the specific form of the light source, positioning the fiber's starting end, detection, amplification, recording, etc. may take many forms in addition to those illustrated and described above, and that such modification will still be within the spirit and scope of the appended claims.

What is claimed is:

1. A method of monitoring the loss characteristics of a length of an optical fiber as it is being drawn from an optical fiber preform comprising the steps of:

providing a light source;

positioning the starting end of said fiber adjacent a detector;

utilizing said fiber as it is being drawn to transmit light from said light source longitudinally through said fiber to said detector;

deriving a signal from said detector as a function of the length of said fiber and the light transmission characteristics of said fiber; and supplying the thus derived signal to a utilization mechanism, whereby said derived signal may be utilized to obtain an objective measure of the loss per unit length of said fiber for purposes of quality control or identification of the fiber as it is being drawn in terms of its light transmission characteristics.

2. The method as set forth in claim 1, wherein said utilization mechanism is a meter.

3. The method of claim 1, wherein said utilization mechanism is a strip chart recorder including the further step of producing a visible record of the light transmission characteristic of said optical fiber as it is drawn as a function of the length of the fiber.

4. The method of claim 1 wherein said light source is the thermal radiation produced by heating a fiber preform to the drawing temperature.

5. The method of claim 1, wherein said light source is a laser directed into the end of a fiber preform opposite the end which is being drawn to produce said fiber.

6. An apparatus for measuring continuously the light attenuation characteristics of a length of an optical fiber as it is drawn comprising:
- an optical fiber preform positioning means to heat said preform to a temperature sufficient to reduce its viscosity to permit it to be drawn;
- drawing means;
- means for holding the starting end of said optical fiber after it is drawn in a fixed position;
- means for converting the light transmitted longitudinally through said optical fiber to derive an electrical signal which varies as a function of the length of said fiber and the attenuation characteristics of said fiber; and
- means utilizing said electrical signal, whereby said derived signal may be utilized to obtain an objective measure of the loss per unit length of said fiber for purposes of quality control or identification of the fiber as it is being drawn in terms of its light transmission characteristics.

7. The apparatus as set forth in claim 6 further including recording means for recording the attenuation characteristics of said optical fiber as a function of the length of said fiber.

8. The apparatus as set forth in claim 6 further including means for utilizing the signal obtained to control an operating parameter of said means for drawing said preform into said fiber.

9. The apparatus as set forth in claim 6 further including an independent light source directed onto the end of said preform while said fiber is being drawn.

10. The apparatus as set forth in claim 6 wherein said means for holding the starting end of said optical fiber comprises a rotating shaft having a hollow end therein, an entrance slot for said starting end of said fiber permitting said starting end to be positioned in said hollow portion and clamping means for holding said starting end in position.

11. Apparatus for measuring continuously the light attenuation characteristics of a length of an optical fiber as it is drawn comprising:
- means for providing a modulating signal;
- a light source;
- means for driving said light source to produce a modulated light signal;
- an optical fiber preform end positioning means adjacent the output of said light source;
- means for heating said preform to a temperature sufficient to reduce its viscosity to permit it to be drawn;
- drawing means;
- means for collecting said drawn fiber;
- means for holding the starting end of said optical fiber after it is drawn in a fixed position;
- means adjacent said starting end for converting the light transmitted longitudinally through said optical fiber preform and drawn optical fiber into an electrical signal which varies as a function of the length of said fiber and the attenuation characteristics of said fiber; and
- means utilizing said electrical signal, whereby said derived signal may be utilized to obtain an objective measure of the loss per unit length of said fiber for purposes of quality control or identification of the fiber as it is being drawn in terms of its light transmission characteristics.

12. The apparatus as set forth in claim 11 further including recording means for recording the attenuation characteristics of said optical fiber as a function of the length of said fiber.

13. The apparatus as set forth in claim 11 further including means for utilizing the signal obtained to control an operating parameter of said means for drawing said preform into said fiber.

* * * * *